United States Patent
Iida

(10) Patent No.: US 7,660,216 B2
(45) Date of Patent: Feb. 9, 2010

(54) DISK REPRODUCING APPARATUS AND METHOD

(75) Inventor: Tomohiro Iida, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 639 days.

(21) Appl. No.: 11/349,906

(22) Filed: Feb. 9, 2006

(65) Prior Publication Data

US 2006/0187791 A1    Aug. 24, 2006

(30) Foreign Application Priority Data

Feb. 22, 2005    (JP) .............................. 2005-045484

(51) Int. Cl.
G11B 7/00    (2006.01)
(52) U.S. Cl. ............... 369/47.28; 369/47.48; 369/53.35
(58) Field of Classification Search .............. 369/59.11, 369/47.1, 47.17, 47.18, 47.28, 53.32, 53.34, 369/53.35, 53.42, 59.12, 59.19, 47.15, 47.48, 369/59.16, 53.33
See application file for complete search history.

(56) References Cited

U.S. PATENT DOCUMENTS

| 7,116,617 | B2 * | 10/2006 | Takeda ..................... 369/47.53 |
| 7,120,110 | B2 | 10/2006 | Mashimo |
| 7,342,986 | B2 | 3/2008 | Nakamura et al. |
| 2003/0053386 | A1 | 3/2003 | Takeda |

FOREIGN PATENT DOCUMENTS

| JP | 5-81678 | 4/1993 |
| JP | 7-169059 | 7/1995 |
| JP | 2004-234737 A | 8/2004 |
| JP | 2005-18843 A | 1/2005 |
| TW | 1226044 B | 1/2005 |

OTHER PUBLICATIONS

Japanese Office Action dated Jul. 21, 2009 with partial English-language translation.
Taiwanese Office Action dated Sep. 8, 2009 with English-language translation.

* cited by examiner

Primary Examiner—Nabil Z Hindi
(74) Attorney, Agent, or Firm—McGinn IP Law Group, PLLC

(57) ABSTRACT

To provide a disk reproducing apparatus capable of reading data at a lower error rate without requiring a complicated circuit configuration. An embodiment of the present invention provides a disk reproducing apparatus for reproducing a data signal based on a signal read from a disk and having a clock cycle that is an integral multiple of a cycle of a reproduction clock, including: a clock generating unit generating the reproduction clock based on an input signal obtained by binarizing the signal read from the disk; an error component detecting unit detecting an error component in the input signal; a threshold storage unit storing a threshold value for determining the error component; and a data signal reproducing unit reproducing the data signal in the input signal based on the error component detected by the error component detecting unit and the threshold value stored in the threshold storage unit.

20 Claims, 8 Drawing Sheets

DISK REPRODUCING APPARATUS AND METHOD

BACKGROUND OF THE INVENTION

1. Field of the Invention

The present invention relates to a disk reproducing apparatus and a disk reproducing method. In particular, the invention relates to a disk reproducing apparatus and a disk reproducing method for reproducing a binary input signal.

2. Description of Related Art

In recent years, there is an increasing demand to downsize an optical disk and record information on the optical disk with a higher density. To meet such a demand, an edge recording system has been proposed.

According to the edge recording system, in the case of recording data as a binary code string based on 1 and 0, light intensity data is inverted with a bit "1" to create a recording light beam emission pattern and irradiate an optical disk with a recoding light beam.

Such an edge recording system places importance on an edge position, and needs to read data with the edge position being fixed and reproduce the data.

However, an error occurs at the time of reading data due to various factors such as a laser irradiation power or inclination of a disk surface, and the data cannot be correctly reproduced in some cases.

To overcome such defects, a support for the read data such as an error correction function has been provided, but the most important thing is to minimize an error in reading data.

As a method of minimizing the error, there has been proposed a method of measuring a pulse width at the time of detecting an edge to shorten the pulse width in inverse proportion to the measurement result (for example, see Japanese Unexamined Patent Application Publication No. 5-81678). This method is devised to deal with a situation that a pulse width of a read signal is larger than an actual recorded data but has a problem in that an error cannot be corrected when a pulse width shorter than that of the recorded data is measured.

Further, a double-edge detection method capable of detecting both edges to more accurately read data has bee also proposed (for example, see Japanese Unexamined Patent Application Publication No. 7-169059). However, this method needs to detect both of a rising edge and a falling edge and thus disadvantageously requires a complicated circuit configuration.

SUMMARY OF THE INVENTION

An aspect of the present invention provides a disk reproducing apparatus for reproducing a data signal based on a signal read from a disk and having a clock cycle that is an integral multiple of a cycle of a reproduction clock, including: a clock generating unit generating the reproduction clock based on an input signal obtained by binarizing the signal read from the disk; an error component detecting unit detecting an error component in the input signal; a threshold storage unit storing a threshold value for determining the error component; and a data signal reproducing unit reproducing the data signal in the input signal based on the error component detected by the error component detecting unit and the threshold value stored in the threshold storage unit.

A disk reproducing apparatus according to another aspect of the present invention includes: a clock generating unit generating a reproduction clock based on an input signal obtained by binarizing a signal obtained by reading data recorded on a disk; a measuring unit measuring a pulse width of the input signal; and a data signal reproducing unit generating a reproduction signal from the input signal that is corrected based on one edge of the input signal and a measurement result from the measuring unit.

Another aspect of the present invention provides a disk reproducing method for reproducing a data signal based on a signal read from a disk and having a clock cycle that is an integral multiple of a cycle of a reproduction clock, including: generating the reproduction clock based on an input signal obtained by binarizing the signal read from the disk; detecting an error component in the input signal; and comparing the detected error component with a threshold value to reproduce the data signal in the input signal based on a comparison result.

With such a structure, data can be corrected based on a threshold value, data can be read at a lower error rate without requiring a complicated circuit configuration.

According to the present invention, data having a pulse width longer or shorter than that of recorded data can be corrected, making it possible to read data at a lower error rate.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

First Embodiment

Figure 1:
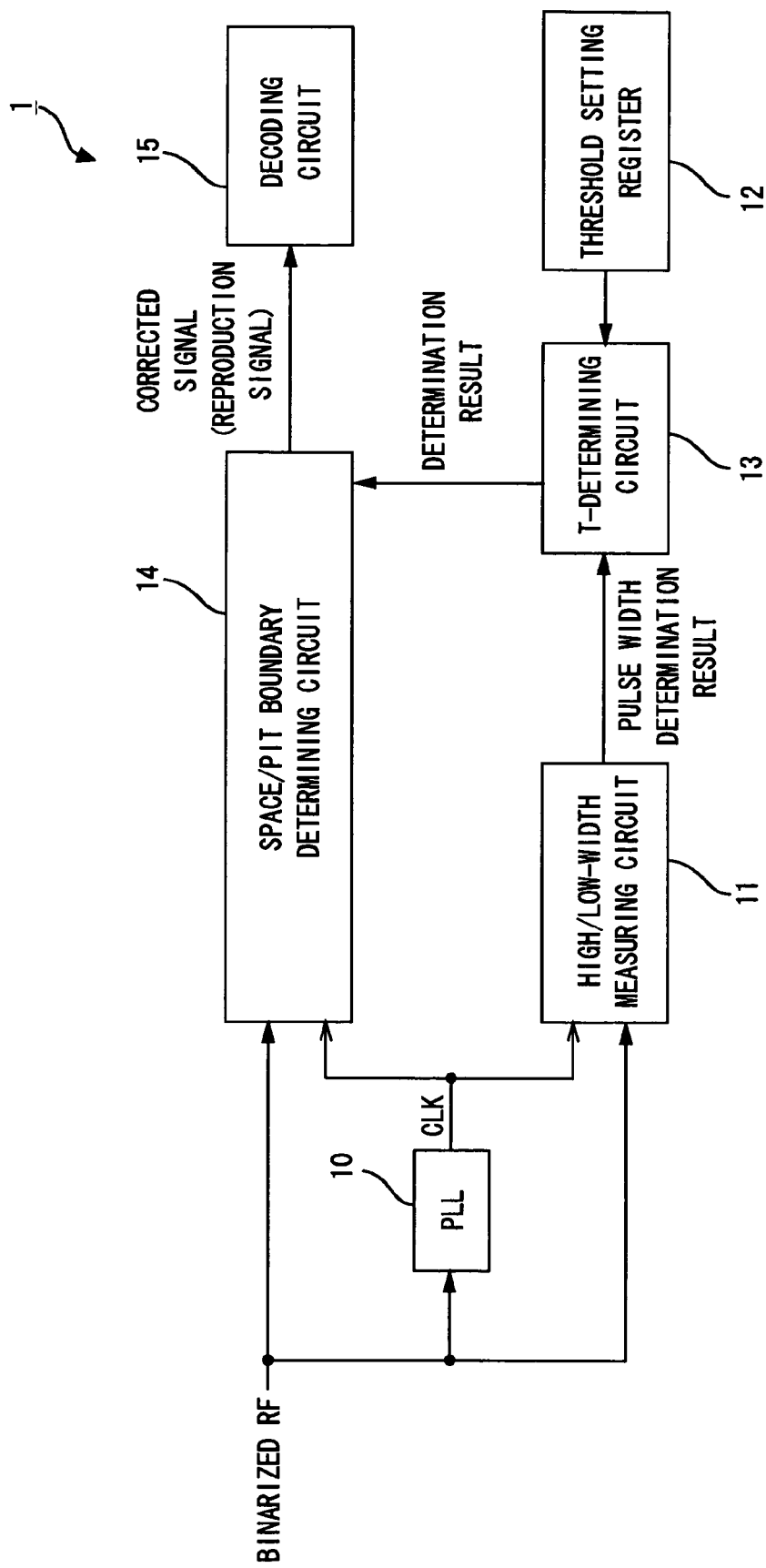
FIG. 1 is a block diagram showing the structure of a disk reproducing apparatus according to a first embodiment of the present invention.

FIG. 1 is a block diagram showing the configuration of an input unit of a disk reproducing apparatus according to a first embodiment of the present invention. A disk reproducing apparatus of the present invention includes PLL 10, High/Low-width measuring circuit (hereinafter, referred to as "H/L-width measuring circuit") 11, a threshold setting register 12, a T-determining circuit 13, a space/pit boundary determining circuit 14, and a decoding circuit 15.

The PLL 10 is a clock pulse generating unit for generating a reading clock pulse (hereinafter, referred to as "reproduction clock pulse") based on an RF signal obtained by binarizing signal read from an optical disk or other such disks, for example. The H/L-width measuring circuit 11 is a circuit for measuring a pulse width of a binarized RF signal, that is, a High or Low width based on the reading clock pulse (reproduction clock pulse). A specific measuring method is described later.

The threshold setting register 12 which serves as a threshold storage unit or a threshold setting unit is a register for recording a threshold value used for determination in the T-determining circuit 13. As the threshold value to be recorded, a predetermined value may be used as a fixed value or may be rewritten with an external device by the following method or the like.

The T-determining circuit 13 which serves as an error component detecting unit determines the number of reproduction clock pulses within the High/Low width measured by the H/L-width measuring circuit 11 and outputs the determination result. In this embodiment, description is given on the assumption that the H/L-width measuring circuit 11 measures the High width of the binarized RF signal, and the T-determining circuit 13 determines the number of reproduction clock pulses within the High width to output the determination result. Incidentally, the H/L-width measuring circuit 11 may measure the Low width, and the T-determining circuit 13 may determine the number of reproduction clock pulses within the Low width to output the determination result.

When determining the number of clock pulses, the T-determining circuit 13 determines whether or not a deviation from an integral multiple of the number of reproduction clock pulses within the High width corresponds to one clock cycle based on a threshold value set by the threshold setting register 12. Then, the number of clock pulses within the High width is sent as the determination result to the space/pit boundary determining circuit 14. A specific determination method of the T-determining circuit 13 is described later.

The space/pit boundary determining circuit 14 which serves as a data signal reproducing unit determines a pit boundary based on the binarized RF signal and the determination result from the T-determining circuit 13 to correct the binarized RF signal. The space/pit boundary determining circuit 14 has a counter that is reset on each rising edge of the binarized RF signal (Rise edge) and incremented on the Rise edge of the reproduction clock pulse. After counting the reproduction clock pulses, the space/pit boundary determining circuit 14 compares the count value with the number of clock pulses as the determination result from the T-determining circuit 13. If matched, the space/pit boundary determining circuit 14 corrects the binarized RF signal by setting the Rise edge of the reproduction clock pulse as a falling edge (Fall edge) of the binarized RF signal. The corrected signal (corrected RF signal, hereinafter referred to as "reproduction signal") is sync with the reproduction clock. The reproduction signal is sent to the decoding circuit 15 and decoded.

The decoding circuit 15 decodes the reproduction signal generated by the space/pit boundary determining circuit 14. A decoding method is based on an encoding method. In this case, the decoding circuit 15 may have an error correction function. In this way, a data error can be suppressed.

Figure 2:
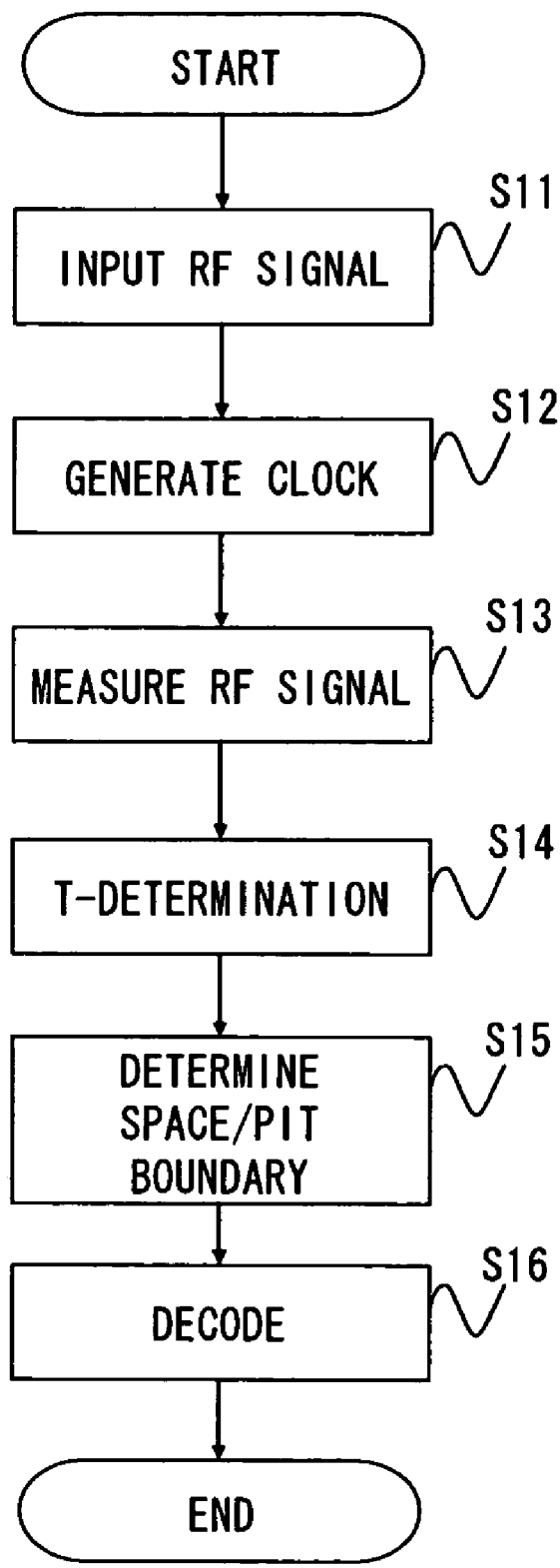
FIG. 2 is a flowchart showing a processing flow of the disk reproducing apparatus according to the first embodiment of the present invention.

Referring next to a flowchart of FIG. 2, a processing flow of the disk reproducing apparatus of the present invention is described.

First, a pickup (not shown) reads a recording surface of the optical disk, and the read signal is corrected by an RF amplifier (not shown) and binarized into the RF signal. The binarized RF signal is supplied to the PLL 10, the H/L-width measuring circuit 11, and the space/pit boundary determining circuit 14 (S11).

When supplied with the binarized RF signal, the PLL 10 generates a reproduction clock the falling edge of which is synchronous with the Rise edge of the binarized RF signal (S12) At this time, a clock frequency is previously determined. Assuming that an ideal RF signal is input, the High/Low width of the RF signal is a multiple integral of the clock cycle of the reproduction clock generated by the PLL 10. However, in practice, the High/Low width of the input RF signal is not a multiple integral of the clock cycle in many cases. This is because an error occurs at the time of reading data due to various factors such as a fluctuation of laser irradiation power or inclination of an optical disk.

The PLL 10 generates the reproduction clock and then supplies the generated clock to the H/L-width measuring circuit 11, and the space/pit boundary determining circuit 14. The H/L-width measuring circuit 11 measures the High/Low width of the binarized RF signal and determines how many times the High/Low width is the clock cycle of the RF signal (S13). A measuring method is described later. The measurement is carried out on the basis of 1/N (N is an integer of 2 or more) of one reproduction clock cycle. For example, provided that N is 16 and a reproduction clock cycle (period) is represented by T, the High width is measured on the basis of $\frac{1}{16}T$ like ($3T+\frac{3}{16}T$). A portion shorter than one clock cycle, $\frac{3}{16}T$, corresponds to an error component.

The H/L-width measuring circuit 11 determines how many times the High/Low width of the binarized RF signal is the reproduction cycle and then outputs the measurement result to the T-determining circuit 13. The T-determining circuit 13 receives the measurement result from the H/L-width measuring circuit 11, and then determines the number of reproduction clock pulses within the High width including the error component based on the threshold value stored in the threshold setting register 12 (S14). That is, if the error component is less than the threshold value, 0T is set. Otherwise, 1T is set.

After the completion of the determination with the T-determining circuit 13, the T-determining circuit 13 sends the measurement result to the space/pit boundary determining circuit 14. The space/pit boundary determining circuit 14 receives the determination result from the T-determining circuit 13 and then generates the reproduction signal (the corrected data) based on the determination result and the binarized RF signal (S15). The space/pit boundary determining circuit 14 outputs the reproduction signal to the decoding circuit 15.

Here, the binarized RF signal to be input to the space/pit boundary determining circuit 14 is a signal the Rise edge of which is synchronous with the Fall edge of the reproduction clock. The space/pit boundary determining circuit 14 adjusts a position of the falling edge of the RF signal based on the number of reproduction clocks within the High width that is notified by the T-determining circuit 13 to generate the reproduction signal.

The decoding circuit 15 decodes the reproduction signal from the space/pit boundary determining circuit 14 (S16). At this time, an error correction processing is effected at the decoding circuit 15 or a subsequent stage thereof. In this embodiment, however, the error component is compared with the threshold value (T-determination), and input signal is adjusted based on the comparison result and output as reproduction signal. Hence, as compared with a conventional method involving no adjustment, an error rate can be lowered.

Further, the value in the threshold setting register 12 can be flexibly changed based on an error rate in the decoding circuit 15. It is thereby possible to determine an allowable level of error components and determine whether or not to count the error components as 1T based on the error rate. The decoded data is reproduced by a reproducing unit (not shown) connected with the decoding circuit 15.

Next, a processing of each block is described in detail. First, a method of measuring the High/Low width of the RF signal by use of the H/L-width measuring circuit 11 is described in detail. The H/L-width measuring circuit 11 carries out the measurement using N clocks. A phase difference among the N clocks is 360°/N. Herein, the number of phases N for the reproduction clock is set to 16, and N-phase clocks are generated. Incidentally, the number of phases N is not limited to 16 but is preferably the powers of 2 like 2, 4, 8, 16, and 32. The 16 clocks are represented by CLK1 to CLK16, respectively. The CLK1 to CLK16 may be generated by an internal clock generating circuit or externally supplied.

Figure 3:
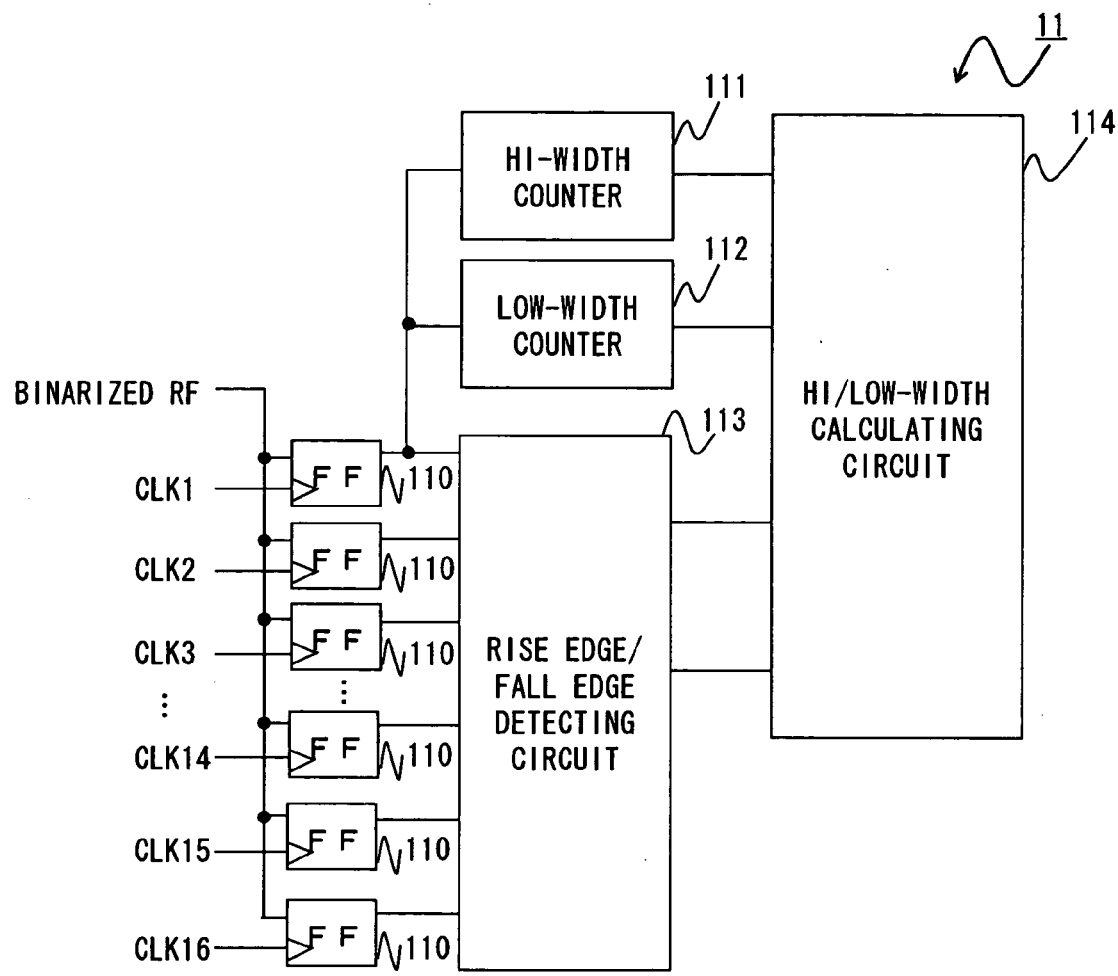
FIG. 3 is a block diagram showing the configuration of a High/Low-width measuring circuit according to the first embodiment of the present invention.

FIG. 3 shows a structural example of the H/L-width measuring circuit 11 of this embodiment. The H/L-width measuring circuit 11 includes an FF 110, a High-width counter 111, a Low-width counter 112, a Rise edge/Fall edge detecting circuit 113, and a High/Low-width calculating circuit 114.

The FF 110 receives one of the clocks CLK1 to CLK16 and the binarized RF signal to detect the Rise or Fall edge of the input signals. The High-width counter 111 and the Low-width counter 112 receives a reference clock, for example, CLK1 to count the number of clock pulses CLK1 within the High width or Low width. The counting is effected for each Rise edge and each Fall edge. The Rise edge/Fall edge detecting circuit 113 detects two Rise edges of the clocks CLK1 to CLK16 between which the Rise edge/Fall edge of the RF signal appears. The High/Low-width calculating circuit 114 receives the count values from the High-width counter 111 and the Low-width counter 112, and the detection result from the Rise edge/Fall edge detecting circuit 113 to derive the High width and the Low width.

Figure 4:
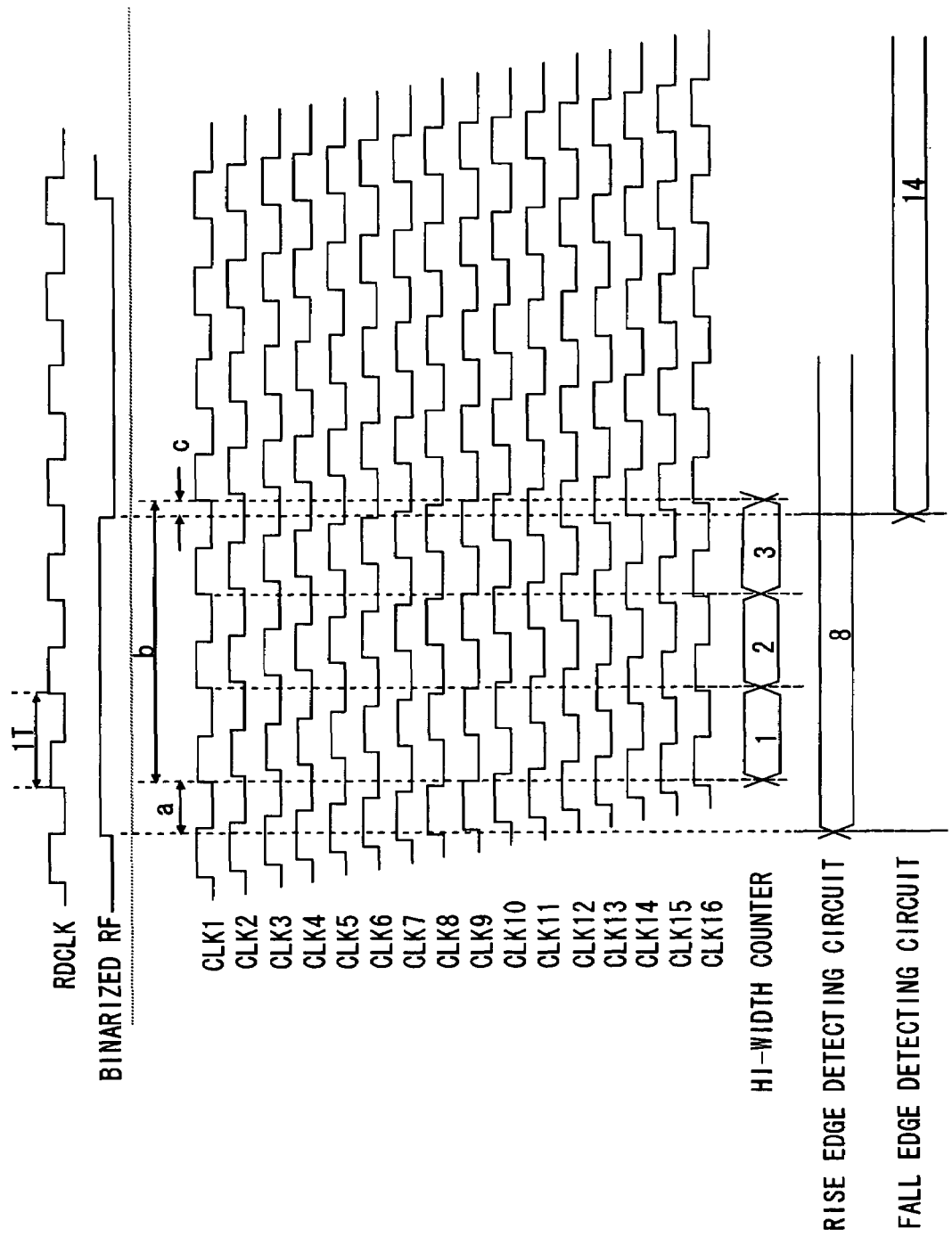
FIG. 4 is a timing chart showing an operational flow of the High/Low-width measuring circuit according to the first embodiment of the present invention.

To elaborate, the H/L-width measuring circuit 11 measures the Rise edge and Fall edge of the RF signal using the clocks CLK1 to CLK16. FIG. 4 is a waveform chart of each circuit of the H/L-width measuring circuit 11 of this embodiment. As shown in FIG. 4, in this embodiment, the Rise edge of the RF signal appears between the Rise edge of CLK8 and the Rise edge of CLK9, more specifically, appears closer to the Rise edge of CLK8. Hence, the Rise edge/Fall edge detecting circuit 113 determines the Rise edge of the RF signal as "8". Further, the Fall edge of the RF signal appears between the Rise edge of CLK14 and the Rise edge of CLK15, more specifically, appears closer to the Rise edge of CLK14. Hence, the Rise edge/Fall edge detecting circuit 113 determines the Fall edge of the RF signal as "14".

In addition, the H/L-width measuring circuit 11 includes a counter that is incremented on each Rise edge of CLK1. As mentioned above, in this embodiment, the number of clock pulses CLK1 between the Rise edge and Fall edge of the RF signal is counted for measuring the High width as in the illustrated example of FIG. 4. In this example, the count value is "3".

The H/L-width measuring circuit 11 measures the High width of the RF signal using those values. In the illustrated example of FIG. 4, the number of reproduction clock pulses within the High width is derived from the count value (n0) of "3", the Rise edge value (n1) of "8", and the Fall edge value (n2) "14". The CLK1 has the same cycle as the reproduction clock RDCLK although not in phase with the reproduction clock RDCLK. Thus, the number of clock pulses CLK1 within the High width is the same as the number of reproduction clock pulses.

The High width is represented by the expression (a+b−c) where "a", "b", and "c" are illustrated in FIG. 4. Thus, a=(1T−n1/16T), b=n0×T, c=(1T−n2/16T). In the illustrated example of FIG. 4, the Rise edge detecting circuit of the Rise edge/Fall edge detecting circuit 113 sends the value n1 of "8", so "a" equals (1T−8/16T). Based on the count value n0 of "3", "b" equals 3T. The Fall edge detecting circuit of the Rise edge/Fall edge detecting circuit 113 sends the value n2 of "14", so "c" equals (1T−14/16T). A value of (a+b−c) is derived from these values and thus equals (3T+6/16T). That is, assuming that the reproduction clock cycle is represented by T, the H/L-width measuring circuit 11 determines the High width as (3T+6/16T).

Figure 5:
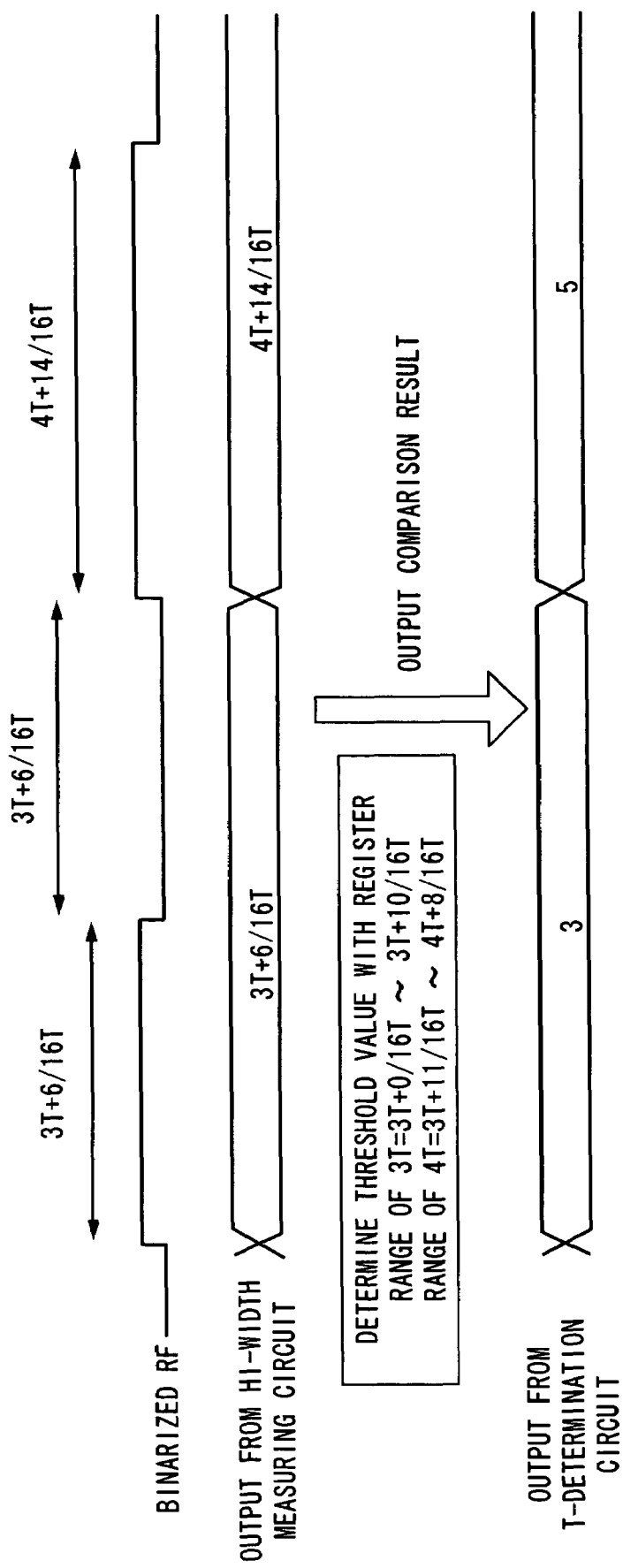
FIG. 5 is a timing chart showing a processing flow of a T-determining circuit according to the first embodiment of the present invention.

Next, a processing of The T-determining circuit 13 is described. The T-determining circuit 13 carries out determination as below. FIG. 5 shows a processing method of the T-determining circuit of this embodiment. The T-determining circuit 13 receives the measurement result, 3T+6/16T, from the H/L-width measuring circuit 11. At this time, it is assumed that a threshold value stored in the threshold setting register 12 is 10/16T. This threshold value is used for determining whether a deviation from an integral multiple of the number of reproduction clock pulses is 1T or 0T. The T-determining circuit 13 determines whether a fraction of the measurement result from the H/L-width measuring circuit 11 (the fraction is less than 1T) is 1T or 0T through the comparison with the threshold value, whereby the measurement result is set to an integral multiple of clock cycle T.

The T-determining circuit 13 compares the threshold value 10/16T with the deviation from an integral multiple of the number of reproduction clock pulses, that is, a fraction in the input measurement result, i.e., 6/16T. The comparison result shows that 6/16T<10/16T, so the fraction is less than the threshold value and is regarded as 0T. Consequently, the measurement result, 3T+6/16T, equals 3T.

If the T-determining circuit 13 receives the measurement result, 4T+14/16T, from the H/L-width measuring circuit 11, the T-determining circuit 13 compares the threshold value 10/16T with a fraction in the input measurement result, i.e., 14/16T. The comparison result shows that 14/16T>10/16T, so the fraction 14/16T that is less than one cycle is regarded as 1T. Substituting 1T into the measurement result, 4T+14/16T, gives the expression of (4T+1T=5T).

Figure 6:
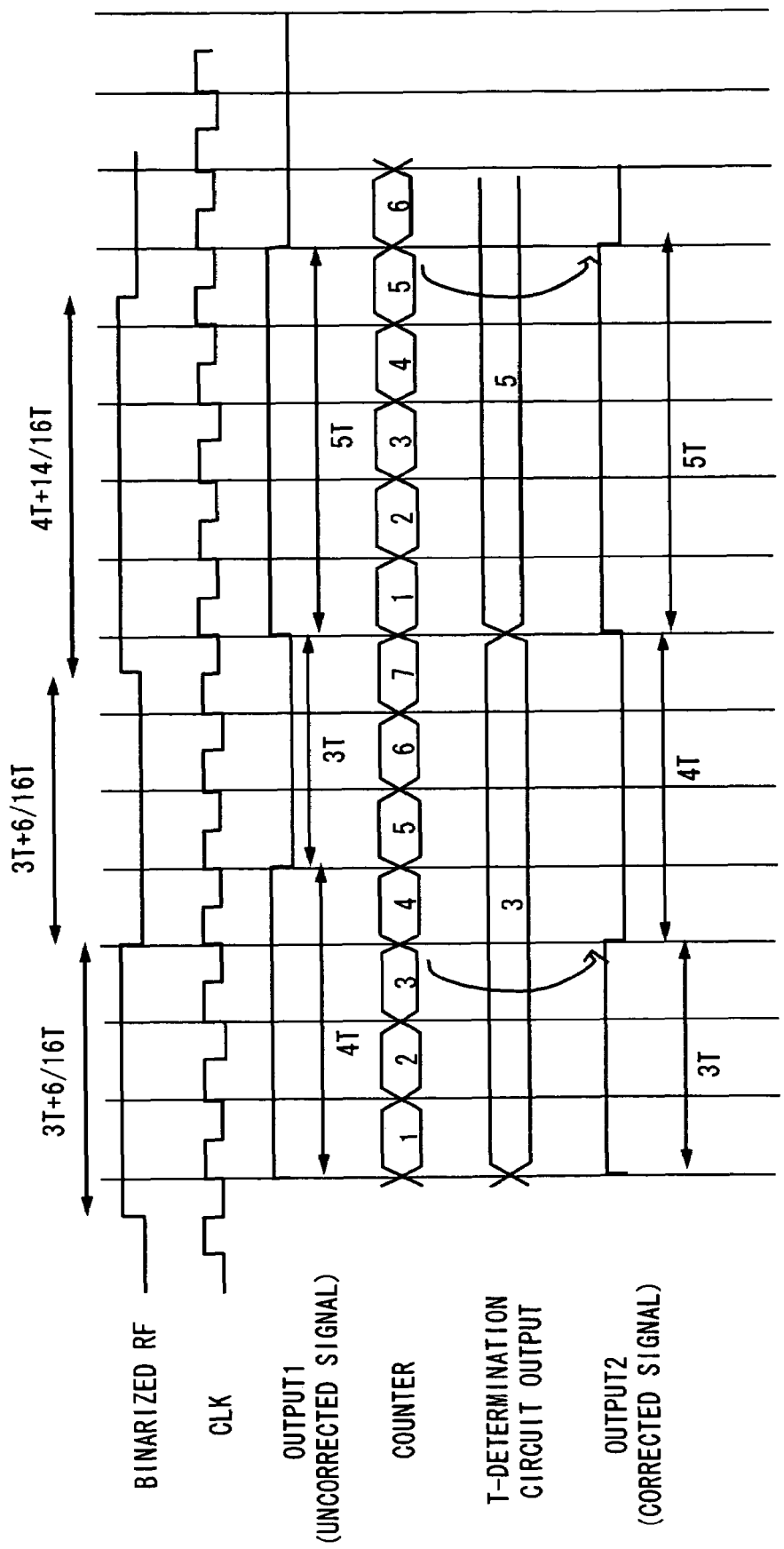
FIG. 6 is a timing chart showing a processing flow of the disk reproducing apparatus according to the first embodiment.

Next, a processing of the space/pit boundary determining circuit 14 is described. FIG. 6 shows a processing flow of the space/pit boundary determining circuit 14. If the measured High/Low width of the RF signal is as illustrated in FIG. 6, the High width and Low width of uncorrected output signal are 4T, 3T, and 5T as indicated by an output 1 (an uncorrected signal).

The space/pit boundary determining circuit 14 has a counter that is reset on each Rise edge of the RF signal and incremented on Rise edge of the reproduction clock as mentioned above. The space/pit boundary determining circuit 14 determines a position where the count value matches the determination result from the T-determining circuit 13 as the Fall edge of the RF signal at the time of correcting the RF signal. In this example, if the determination result from the T-determining circuit 13 is "3", a position where the count value of the counter becomes "3" is set as the Fall edge to generate a reproduction signal. Through this correction, the High width and the Low width of the output signal are corrected to 3T, 4T, and 5T as indicated by an output 2 (a corrected signal). In this way, in this embodiment, the RF signal is corrected to adjust input signal into an appropriate pulse width in the case of measuring either a pulse shorter than that of recorded data or a pulse longer than that of the recorded data.

In this embodiment, the High width of the RF signal is measured to determine how many reproduction clock cycles are included in the High width. Upon this determination, the T-determining circuit 13 determines whether an error component less than an integral multiple of the number of reproduction clocks is 1T or 0T based on a threshold value. Then, the RF signal is corrected based on the determination result to output reproduction signal, making it possible to lower an error rate as compared with a conventional method involving no correction. Hence, the number of times error correction is executed can be reduced to accelerate an error correction processing. If an error rate is high and correction cannot be effected, a processing of rereading recording data from an optical disk is necessary. In contrast, an error rate is lowered, whereby a reading speed can be increased.

Further, a value of the threshold setting register 12 can be appropriately changed in accordance with an error rate. Hence, a threshold value optimum for minimizing the error rate can be selected and set based on disk characteristics.

Incidentally, in this embodiment, the High width is measured, but the Low width may be measured or both of the High width and Low width may be measured. Further, the reproduction clock has the Rise edge sync with the Fall edge of the RF signal, but may have the Rise edge sync with the Rise edge of the RF signal.

Second Embodiment

In the above example, the 16 clocks used for the measurement of the High/Low-width measuring circuit are generated based on the reproduction clock input from the PLL but do not necessarily need to be sync with the reproduction clock from the PLL. Therefore, the disk reproducing apparatus may be structured as shown in FIG. 7.

Figure 7:
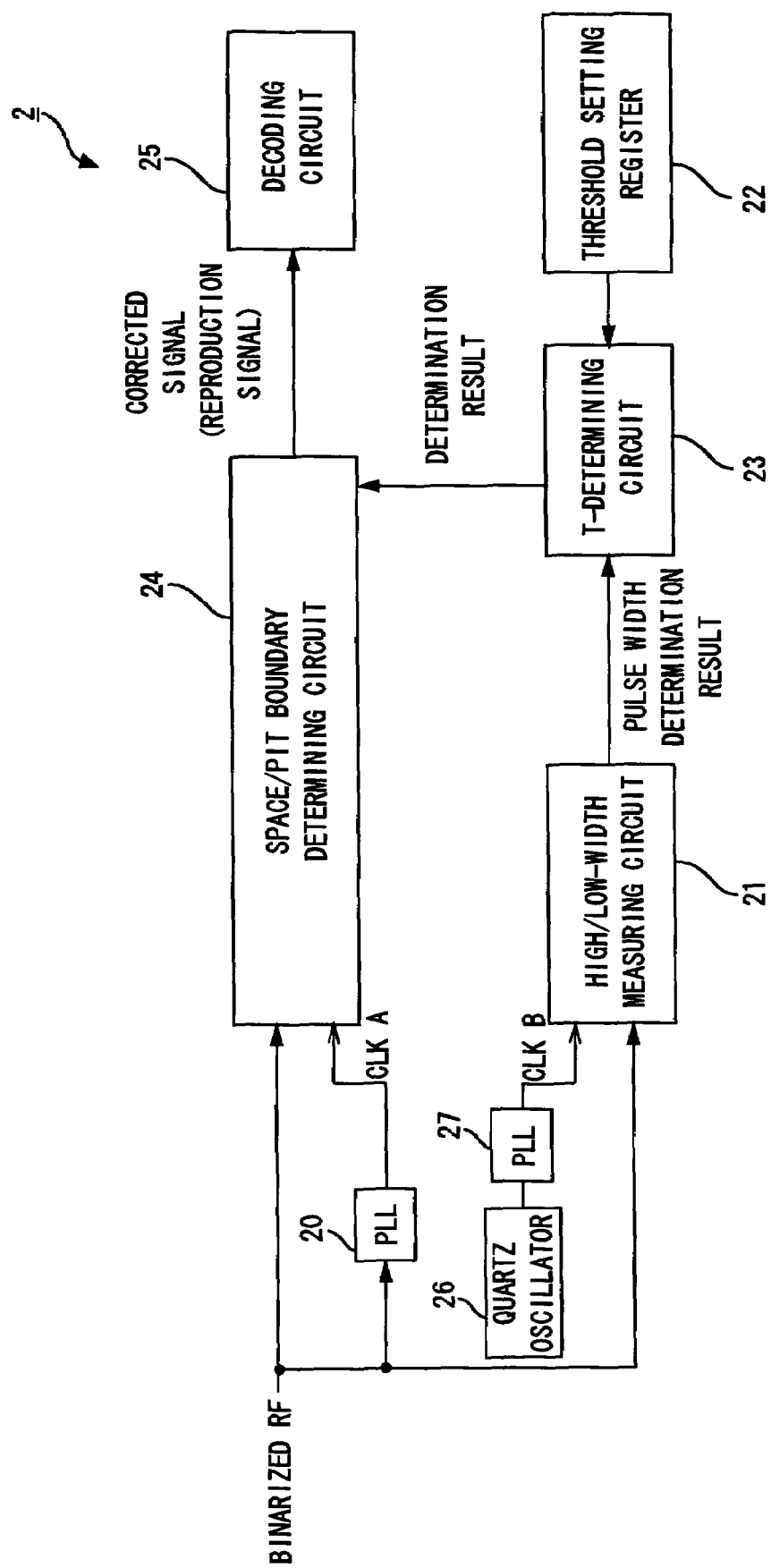
FIG. 7 is a block diagram showing the structure of a disk reproducing apparatus according to a second embodiment of the present invention.

FIG. 7 is a block diagram showing the configuration of an input unit of a disk reproducing apparatus according to a second embodiment of the present invention. A disk reproducing apparatus 2 of this embodiment includes a PLL 20, a High/Low-width measuring circuit 21, a threshold setting register 22, a T-determining circuit 23, a space/pit boundary determining circuit 24, a decoding circuit 25, a quartz oscillator 26, and a PLL 27.

The PLL 20 is a clock generating unit for generating a reading clock (reproduction clock) CLKB based on a binarized RF signal. The High/Low-width measuring circuit 21 measures the High width or Low width of the binarized RF signal based on the reproduction clock CLKA. A specific measuring method is the same as that of the first embodiment.

The threshold setting register 22 records a threshold value used for determination of the T-determining circuit 23. The threshold value recorded in the register may be used as a fixed value or may be rewritten with an external device.

The T-determining circuit 23 compares the High width/Low width measured by the High/Low-width measuring circuit 21 with a threshold value of the threshold setting register 22. A specific comparison method is the same as that of the first embodiment.

The space/pit boundary determining circuit 24 corrects the binarized RF signal based on the comparison result from the T-determining circuit 23 to output a reproduction signal (the corrected signal). The reproduction signal is sent to the decoding circuit 25 and decoded.

The quartz oscillator 26 supplies a clock to the PLL 27. The PLL 27 generates a clock CLKB having the same clock cycle as the reproduction clock CLKA. That is, the clock CLKB is generated based on a clock from the quartz oscillator 26 so as to have the same clock frequency as a frequency of the reproduction clock CLKA generated by the PLL 20. Further, the PLL 27 generates N clocks that have the same cycle as the clock CLKB. A phase difference among the N clocks is 360°/N.

Figure 8:
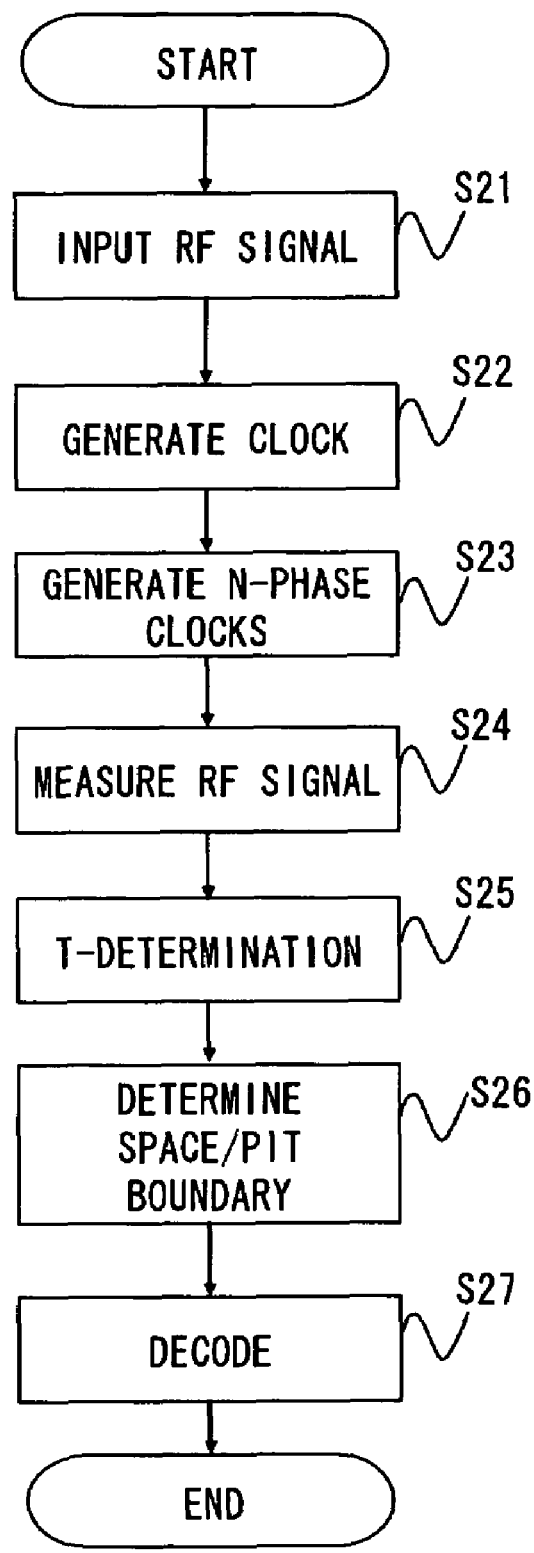
FIG. 8 is a flowchart showing a processing flow of the disk reproducing apparatus according to the second embodiment of the present invention.

Referring next to a flowchart of FIG. 8, a data determining flow of the disk reproducing apparatus of this embodiment is described.

First, a pickup (not shown) reads a recording surface of the optical disk, and the read signal is corrected by an RF amplifier (not shown) and binarized into the RF signal. The binarized RF signal is supplied to the PLL 20, the High/Low-width measuring circuit 21, and the space/pit boundary determining circuit 24 (S21).

The PLL 20 receives the binarized RF signal to generate the reproduction clock CLKA having the Fall edge sync with the Rise edge of the binarized RF signal (S22). At this time, a clock frequency is previously determined. Assuming that an ideal RF signal is input, the High/Low width of the RF signal is a multiple integral of the clock cycle of the clock CLKA. However, in practice, the High/Low width of the input RF signal is not a multiple integral of the clock cycle of the clock CLKA in many cases. This is because an error occurs at the time of reading signal due to various factors such as a laser irradiation power or inclination of an optical disk.

The PLL 20 generates the reproduction clock CLKA and then outputs the generated reproduction clock CLKA to the space/pit boundary determining circuit 24. Further, the PLL 27 receives a clock generated by the quartz oscillator 26 to generate the clock CLKB having the same cycle as the reproduction clock CLKA and generate N clocks. A phase difference among the N clocks is 360°/N (S23). Further, the reproduction clock CLKA and the clock CLKB may be out of phase. The PLL 27 outputs these clocks to the High/Low-width measuring circuit 21.

The High/Low-width measuring circuit 21 determines how many times the clock cycle of the input RF signal is the cycle of the reproduction clock CLKB (S24). The measurement is carried out using the above N-phase clocks on the basis of 1/N of one clock cycle (N is an integer of 2 or more). If N=16, for example, the High width or Low width is measured on the basis of 1/16T. "T" is cycle of the reproduction clock CLKB.

The High/Low-width measuring circuit 21 determines how many times the cycle of the RF signal is that of the reproduction clock CLKB to send the determination result to the T-determining circuit 23. The T-determining circuit 23 receives the determination result from the High/Low-width measuring circuit 21 to compare the determination result with a threshold value stored in the threshold setting register 22 (S25).

After the completion of the determination of the T-determining circuit 23, the T-determining circuit 23 outputs the determination result to the space/pit boundary determining circuit 24. The space/pit boundary determining circuit 24 receives the determination result from the T-determining circuit 23 to create final data as the reproduction signal (the corrected signal) based on the received determination result and the RF signal (S26). The space/pit boundary determining circuit 24 sends the determined data (the reproduction signal) to the decoding circuit 25.

The decoding circuit 25 receives the reproduction signal from the space/pit boundary determining circuit 24 to decode the signal (S27). Then, the decoded signal is reproduced by a reproducing unit (not shown) subsequent to the decoding circuit 25.

This embodiment also produces the same effects as those of the first embodiment, and enables data reading at a lower error rate without requiring a complicated circuit configuration. That is, the space/pit boundary determining circuit 24 performs T-determination based on the threshold value stored in the threshold setting register 22 to determine whether a deviation from an integral multiple of reproduction clock cycle is 1T or 0T and correct the RF signal, whereby the error rate can be lowered. Therefore, the number of times the error correction is performed can be reduced.

Other Embodiment

In the above embodiments, the clocks used for the measurement of the High/Low-width measuring circuit (11, 21) have the same frequency, but the measurement may be carried out using clocks the Rise edges of which are sync with one another and the Fall edges of which are out of sync.

In the above description, the High/Low-width measuring circuit detects the Rise edge and the Fall edge of the RF signal based on the Rise edge of the clock, but each edge of the RF signal may be detected using the Fall edge of the clock instead of the Rise edge of the clock.

It is apparent that the present invention is not limited to the above embodiment that may be modified and changed without departing from the scope and spirit of the invention.

What is claimed is:

1. A disk reproducing apparatus for reproducing a data signal based on a signal read from a disk and having a clock cycle that is an integral multiple of a cycle of a reproduction clock, said apparatus comprising:
   a clock generating unit generating the reproduction clock based on an input signal obtained by binarizing the signal read from the disk;
   an error component detecting unit detecting an error component in the input signal;
   a data signal reproducing unit reproducing the data signal in the input signal based on the error component detected by the error component detecting unit and a threshold value for determining the error component; and
   an N-phase clock generating unit dividing a clock generated with the clock generating unit into N phases to generate N-phase clocks,
   wherein the error component detecting unit detects the error component in the input signal based an the N-phase clocks generated by the N-phase clock generating unit.

2. The disk reproducing apparatus according to claim 1, wherein the error component detecting unit includes a detecting unit detecting a rising edge and a falling edge of the input signal.

3. The disk reproducing apparatus according to claim 1, wherein the threshold value stored in a threshold storage unit is rewritable.

4. A disk reproducing apparatus, comprising:
   a clock generating unit generating a reproduction clock based on an input signal obtained by binarizing a signal obtained by reading data recorded on a disk;
   a measuring unit measuring a pulse width of the input signal; and
   a data signal reproducing unit generating a reproduction signal from the input signal that is corrected based on one edge of the input signal and a measurement result from the measuring unit,
   wherein the clock generating unit the reproduction clock and N N-phase clocks that are not in phase with the reproduction clock, and
   the measuring unit measures the pulse width based on the N-phase clocks.

5. The disk reproducing apparatus according to claim 4, wherein the measuring unit counts the number of reproduction clocks within the pulse width.

6. The disk reproducing apparatus according to claim 5, wherein the measuring unit determines whether or not a deviation from an integral multiple of the number of reproduction clocks within the pulse width corresponds to one reproduction clock cycle based on a threshold value.

7. The disk reproducing apparatus according to claim 6, further comprising a threshold setting unit setting the threshold value.

8. A disk reproducing apparatus, comprising:
   a clock generating unit generating a reproduction clock based on an input signal obtained by binarizing a signal obtained by reading data recorded on a disk;
   a measuring unit measuring a pulse width of the input signal; and
   a data signal reproducing unit generating a reproduction signal from the input signal that is corrected based on one edge of the input signal and a measurement result from the measuring unit,
   wherein the clock generating unit generates the reproduction clock and N N-phase clocks that arc not in phase with the reproduction clock, and
   the measuring unit counts the number of reproduction clocks in the pulse width based on the N-phase clocks.

9. The disk reproducing apparatus according to claim 8, wherein the measuring unit determines whether or not a deviation from an integral multiple of the number of reproduction clocks within the pulse width corresponds to one reproduction clock cycle based on a threshold value.

10. The disk reproducing apparatus according to claim 9, further comprising a threshold setting unit setting the threshold value.

11. The disk reproducing apparatus according to claim 10, wherein the threshold setting unit sets the threshold value based on an error rate of the reproduction signal from the data signal reproducing unit.

12. A disk reproducing method for reproducing a data signal based on a signal read from a disk and having a clock cycle that is an integral multiple of a cycle of a reproduction clock, said method comprising:
   generating the reproduction clock based on an input signal obtained by binarizing the signal read from the disk;
   detecting an error component in the input signal; and
   comparing the detected error component with a threshold value to reproduce the data signal in the input signal based on a comparison result,
   wherein the detecting an error component includes:
      dividing the reproduction clock into N phases based on a generated clock; and
      detecting the error component in the input signal based on the divided clocks.

13. The disk reproducing method according to claim 12, wherein the detecting an error component includes:
   detecting a rising edge and a falling edge of the input signal; and determining the error component based on the detected rising edge and falling edge.

14. The disk reproducing apparatus according to claim 1, wherein said pulse may be either a high pulse or a low pulse.

15. The disk reproducing apparatus according to claim 1, wherein a measurement of said width of said pulse is carried out on a basis of 1/N (N is an integer of 2 or more) of one reproduction clock cycle.

16. The disk reproducing apparatus according to claim 1,
wherein, if said error component is at least said threshold value, then said width of said pulse is counted as said integer number plus one cycles, and
if said error component is less than said threshold value, then said width of said pulse is counted as said integer number of cycles.

17. The disk reproducing apparatus according to claim 1, wherein said error component comprises a difference between an integral number of cycles of said reproduction clock and a width of a pulse of said input signal.

18. The disk reproducing apparatus according to claim 8, wherein the measuring unit counts the number of reproduction clocks within the pulse width.

19. The disk reproducing apparatus according to claim 8, wherein the measuring unit determines whether or not a deviation from an integral multiple of the number of reproduction clocks within the pulse width corresponds to one reproduction clock cycle based on a threshold value.

20. The disk reproducing apparatus according to claim 8, further comprising a threshold setting unit setting the threshold value.

* * * * *